United States Patent [19]

Okabe et al.

[11] Patent Number: 4,537,865
[45] Date of Patent: Aug. 27, 1985

[54] PROCESS FOR PREPARING A PARTICULATE CERAMIC MATERIAL

[75] Inventors: Shinsei Okabe; Hiroshi Komatsu; Yukio Hamaji; Shozo Kojima; Yoshiharu Kato, all of Kyoto, Japan

[73] Assignee: Murata Manufacturing Co., Ltd., Nagaokakyo, Japan

[21] Appl. No.: 629,846

[22] Filed: Jul. 11, 1984

[51] Int. Cl.$^3$ ............................................. C04B 35/46
[52] U.S. Cl. .................................. 501/135; 501/137; 501/138; 501/139; 501/152
[58] Field of Search .................. 501/1, 135, 136, 137, 501/138, 139, 152

[56] References Cited

U.S. PATENT DOCUMENTS 3,983,077  9/1977  Fuller et al. ......................... 501/137

*Primary Examiner*—Helen M. McCarthy
*Attorney, Agent, or Firm*—Finnegan, Henderson, Farabow, Garrett & Dunner

[57] ABSTRACT

A process for preparing a particulate ceramic material comprising the steps of:

(a) adding carbon dioxide or an aqueous solution of a soluble carbonate to first aqueous solution of a nitrate or chloride of Ba, Sr, Ca or Mg in a first vessel to adjust the pH of said first aqueous solution to between 7 and 10 thereby forming a carbonate precipitate;
(b) adding an aqueous solution of a soluble hydroxide to a second aqueous solution of a nitrate or chloride of Ti, Zr, Sn or Pb in a second vessel to adjust the pH of said second aqueous solution to between 7 and 10 thereby forming a hydroxide precipitate;
(c) combining slurries containing the precipitates formed in said first and second vessels;
(d) mixing the combined slurries;
(e) passing the slurries through a filter;
(f) washing the filter cake with water;
(g) drying the filter cake to form a powder;
(h) calcining the dried powder; and
(i) grinding the calcined powder.

4 Claims, 9 Drawing Figures

PROCESS FOR PREPARING A PARTICULATE CERAMIC MATERIAL

BACKGROUND OF THE INVENTION

The present invention relates to a process for preparing the powder of raw ceramic material having fine crystal grain sizes.

As the size of electronic devices becomes increasingly smaller, efforts are being made to reduce the size of components to be incorporated in such devices. An example of such components is a ceramic capacitor, and since it is impossible to achieve a significant increase in dielectric constant by the state-of-the-art technology, the only way to reduce the size of a ceramic capacitor is by decreasing its thickness. However, if the thickness of a ceramic capacitor is simply reduced, its dielectric loss is increased and a greater change in capacitance occurs as a result of changes in DC or AC bias. In particular, if the crystal grain size of the ceramic is as great as 8 $\mu$m, relatively large vacancies (some may be as large as 20 $\mu$m) occur between grains and this causes a drop in the breakdown voltage of the capacitor.

In order to reduce the thickness of a ceramic capacitor without having these disadvantages, the capacitor must be made of a ceramic having a finer crystal grain size. As the crystal grain size is reduced, the vacancies occurring between grains become smaller so as to improve the breakdown voltage of the capacitor. Desirably, the grain size should be close to 0.6 $\mu$m which is the thickness of the 90° domain wall. This reduces the occurrence of a cubic to tetragonal transformation during a firing step in the state of lowering temperatures. This also prevents the capacitance of the device from dropping as a function of time (aging). As a further advantage, the ratio of the c- to a-axis of the ceramic crystal approaches 1.00 to reduce the change in capacitance resulting from variations in DC or AC bias. An additional advantage is improved mechanical strength.

Conventionally, powders of raw ceramic materials are prepared by the solid-phase reaction technique using dried raw materials such as $BaCO_3$, $CaCO_3$, $SrCO_3$, $TiO_2$, $ZrO_2$ and $SnO_2$. One synthesis method starts with calcination of raw materials such as $BaTiO_3$ and $CaZrO_3$, which are mixed and subsequently fired. In another synthesis method, two or three raw materials selected from the group $BaCO_3$, $CaCO_3$, $SrCO_3$, $TiO_2$ and $ZrO_2$ are mixed in given proportions and the mixture is calcined. However, either method has one serious defect that is attributable to the use of dried $BaCO_3$, $CaCO_3$, $SrCO_3$, $TiO_2$ and $ZrO_2$ as raw materials. These materials are first subjected to a precipitation step to obtain fine colloidal particles, but when they are dried (and subsequently calcined if desired) after filtration, the particles agglomerate to form secondary grains having sizes between 0.5 and 2 $\mu$m. A blend of two or more raw materials comprising such agglomerated secondary particles cannot be ground to a size smaller than 1 $\mu$m. When such a blend is formed into a suitable shape and sintered, the resulting product has crystal grains as large as 8 to 20 $\mu$m and suffers the problems mentioned above (i.e., low breakdown voltage, and variations in capacitance with time, as well as with changes in AC and DC bias).

In order to produce a fine-grained ceramic, raw materials comprising fine colloidal grains as obtained by precipitation must be mixed. This can be realized by either the oxalate or alkoxide method. According to the oxalate method, ions such as Ti and Ba ions are reacted with oxalic acid to precipitate barium titanyl oxalate $[BaTiO(C_2O_4).4H_2O]$; the precipitate is thermally decomposed to $BaTiO_3$ at a temperature higher than 700° C. While the fineness of the grains obtained by this method is fairly satisfactory, no elements other than Ba and Ti can be precipitated simultaneously. Therefore, the oxalate method is unable to produce commercially useful multi-component ceramics. Another disadvantage that makes the oxalate method unsuitable for practical purposes is the high cost of the oxalate formed.

The alkoxide method involves difficulty in preparing alkoxides of various metals, and the alkoxides that could be obtained are very expensive. Another factor that reduces the commercial value of this method is the use of organic solvents because protection must be provided against explosion of solvent vapor.

Both oxalate and alkoxide methods depend on reactions in solutions, but in the absence of a crystal growth inhibitor, the grains grow to sizes between about 1 and 2 $\mu$m during sintering. These methods provide fine primary particles but since they cannot be agglomerated to larger secondary particles, a large amount of binder must be used to agglomerate the fine primary particles. But then, the shaped material shrinks so greatly during firing that the desired ceramic product cannot be produced.

In short, the conventional techniques for preparing raw ceramic materials are defective in that they satisfy none of the requirements mentioned below or they satisfy only some of those requirements:

(1) all the components for making a composite system are precipitated by a reaction in solution, and the growth of crystal grains can be restrained as required;

(2) the respective raw materials can be mixed in solution;

(3) the fine primary grains can be agglomerated to secondary particles in order to reduce the use of a binder in the forming step; and (4) the desired raw ceramic materials can be prepared safely and at low cost.

Therefore, the principal object of the present invention is to provide a process for preparing fine-grained raw ceramic materials without suffering from the defects of the conventional techniques.

SUMMARY OF THE INVENTION

The process of the present invention for preparing the particulate ceramic material comprises the steps of (a) adding carbon dioxide or an aqueous solution of a soluble carbonate such as sodium carbonate or ammonium carbonate to first aqueous solution of a nitrate or chloride of Ba, Sr, Ca or Mg in a first vessel to adjust the pH of said first aqueous solution to between 7 and 10 thereby forming a carbonate precipitate;

(b) adding an aqueous solution of a soluble hydroxide such as sodium hydroxide or ammonium hydroxide to a second aqueous solution of a nitrate or chloride of Ti, Zr, Sn or Pb in a second vessel to adjust the pH of said second aqueous solution to between 7 and 10 thereby forming a hydroxide precipitate;

(c) combining slurries containing the precipitates formed in said first and second vessels;

(d) mixing the combined slurries;

(e) passing the slurries through a filter;

(f) washing the filter cake with water;

(g) drying the filter cake to form a powder;

(h) calcining the dried powder; and
(i) grinding the calcined powder.

In a preferred embodiment, at least one more element selected from the group Nb, Y and rare earth metals may be used in the second vessel. This is effective in regulating the crystal growth during sintering and provides grains of a size not more than 1 μm.

The other advantage of these crystal growth regulators is that they work as a depressor to flatten the peak value of dielectric constant (which occurs at about 120° C. for BaTiO₃). Among the rare earth metals, cerium (Ce) and neodymium (Nd) are weak depressors and are rather effective for the purpose of obtaining high dielectric constant values. Lanthanum (La) and niobium (Nb) are effective in flattening the temperature characteristics of dielectric constant, and for this purpose, Nb is particularly effective. Niobium naturally occurs as a mixture with tantalum (Ta), but the tantalum as an impurity will not impair the effectiveness of Nb greatly. Therefore, a mixture of Nb and Ta may be used in the present invention.

In a more preferred embodiment, another element selected from the group Mn, Al, Si, Bi and Zn may be incorporated in the second vessel as a mineralizer. Other elements that are suitable mineralizers include Fe, Cr, Co and Cu.

BRIEF DESCRIPTION OF THE DRAWINGS

FIGS. 5 (a) and 5 (b) show the temperature characteristics of dielectric dissipation factor(tan δ) and percent change of dielectric constant of laminated ceramic capacitors;

DETAILED DESCRIPTION OF THE INVENTION

According to the process of the present invention, the first and second vessels are charged with predetermined proportions of raw materials; after thorough precipitation, the resulting slurries are mixed; and the mixture is calcined and ground to provide a powder of raw ceramic material having the intended proportions of the respective components.

The mixture of slurries precipitated in the first step comprises primary particles adjacent to each other having sizes between about 0.01 and 0.02 μm. In a subsequent step, the mixture is passed through a filter, washed with water and dried to provide an active material wherein the respective raw materials intermingle in a colloidal and hence highly reactive state.

Figure 1:
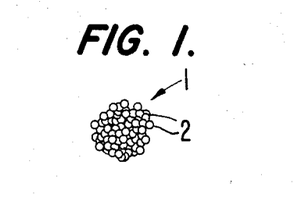
FIG. 1 is a schematic representation of a secondary grain obtained by the process of the present invention.

This material is then calcined, thereby providing a raw ceramic material of ABO₃ type having the predetermined proportions of components. The agglomeration of the primary particles to secondary grains also occurs in the calcining step. A ceramic material comprising secondary particles has a smaller specific surface area (m²/gr) and requires less binder for making a green sheet. The reduced use of a binder leads to a smaller shrinkage that occurs during the firing of the shaped ceramic product. Each secondary particle consists of a mixture of the primary particles of the respective raw materials, so the ceramic obtained by firing the shaped material comprises sufficiently fine particles (1–2 μm). In other words, the agglomeration of primary particles to secondary particles will do no harm to the purpose of obtaining fine-grained ceramic product. A typical secondary grain is illustrated in FIG. 1; a single secondary grain (1) consists of more than one primary particle (2).

The calcination is preferably carried out in the temperature range of 700° to 1,200° C. If the calcination temperature is less than 700° C., the desired powder of raw ceramic material is not synthesized. If the temperature exceeds 1,200° C., the agglomeration to secondary particles becomes excessive.

The powder of raw ceramic material as obtained by the process of the present invention is generally an oxide of ABO₃ type. However, this does not mean that the precipitates formed in the first and second vessels correspond to A and B, respectively. The criteria for selecting the constituent elements used in the respective vessels are as follows: the elements used in the first vessel are such that they can be precipitated as a carbonate, and those used in the second vessel are such that they can be precipitated as a hydroxide.

The atmosphere in the second vessel is controlled to result in a pH within the range of 7 to 10. Outside this range, the constituent elements used will dissolve out and fail to form a precipitate. The pH value used in the first vessel is preferably in agreement with the value used in the second vessel. This is in order to achieve the following two objects: the slurries containing the precipitates formed in the first and second vessels and which are to be mixed should have the same pH value, and the hydroxide precipitated in the second vessel should not dissolve out as a result of pH mismatch with the atmosphere in the first vessel.

An aqueous solution of hydrogen peroxide (H₂O₂) may be added to the second vessel as a stabilizer which serves to prevent precipitation due to the hydrolysis of the solution. In the presence of aqueous H₂O₂, Ti, Zr, Ce and Mn are precipitated as Ti(OOH)(OH)₃, Zr(OOH)(OH)₃, Ce(OH)₃ and Mn(OH)₄, respectively. Such precipitates have the advantage of facilitating filtration and washing operations in the subsequent step.

Analysis of the molar ratio of A to B in the powder of raw ceramic material of ABO₃ type prepared by the process of the present invention revealed that as the content of B increased, the crystal grain size increased to form interstitial gaps between adjacent grains. For the purpose of the present invention, the preferred A to B molar ratio ranges from 1.00:1.00 to 1.00:1.05.

The advantages of the present invention will become more apparent by reading the following non-limiting working examples.

EXAMPLE 1

The following starting materials were used.

| Compounds | Weight (g) |
| --- | --- |
| $BaCl_2$ | 100 |
| $TiCl_4$ | 71.58 |
| $SnCl_4$ | 8.379 |
| $SiCl_4$ | 0.7469 |
| $MnCl_4.4H_2O$ | 0.273 |

In the first vessel, ammonium carbonate [$(NH_4)_2CO_3$] was added to an aqueous solution of $BaCl_2$ to adjust the pH of the mixture to between 9 and 9.5 for providing a $BaCO_3$ precipitate.

The second vessel was charged with a mixture of aqueous solutions of $TiCl_4$, $SnCl_4$, $SiCl_4$ and $MnCl_4.4H_2O$. After adding 15 ml of a stabilizer (30% aqueous $H_2O_2$), ammonium hydroxide ($NH_4OH$) was added to adjust the pH of the mixture to between 9 and 9.5 for producing a precipitate containing Ti, Sn, Si and Mn.

The slurries containing the precipitates formed in the two vessels were combined and the mixture was subjected to filtration and washing with water. The filter cake was crushed in a ball mill, passed through a filter and dried to provide a fine-grained (0.02 μm) raw ceramic material.

This material was calcined at 900° C. for 1 hour to provide a $Ba(TiSn)O_3$ powder. The powder was granulated in the presence of a binder (polyvinyl alcohol) and formed into a disk (diameter: 10 mmφ, thickness: 1 mm) at a pressure of 1,000 kg/cm². The disk was then fired at 1,300° C. for 2 hours to form a disk-shaped article. A coating of silver paste was applied to both sides of this ceramic product to form electrodes. This product was then baked at 800° C. for 30 minutes to produce a capacitor.

The dielectric constant (ε) and dielectric dissipation factor (tan δ) of this capacitor were measured at 1 KHz and 1 Vr.m.s. The temperature characteristics of its dielectric constant (TC) were determined for the temperature range of +10° C. to +85° C. on the basis of the value at +25° C. The results are shown in the following table together with the breakdown voltage.

| ε | tan δ (%) | TC | Breakdown Voltage (kv/mm) |
| --- | --- | --- | --- |
| 18,000 | 2.0 | +20 ~ +70% | 35 |

EXAMPLE 2

The following starting materials were used.

| Compounds | Weight (%) |
| --- | --- |
| $BaCl_2$ | 100 |
| $SrCl_2$ | 1.85 |
| $MgCl_2$ | 0.84 |
| $TiCl_4$ | 72.26 |
| $SnCl_4$ | 3.17 |
| $ZrOCl_2.8H_2O$ | 9.19 |
| $MnCl_2.4H_2O$ | 0.84 |
| $CeCl_3$ | 1.43 |
| $ZnCl_2$ | 0.33 |

In the first vessel, aqueous solutions of $BaCl_2$, $SrCl_2$, $MgCl_2$ and $CeCl_3$ were mixed. To the mixture, sodium carbonate ($Na_2CO_3$) was added to adjust the pH of the mixture to between 9 and 9.5 for forming $BaCO_3$, $SrCO_3$, $MgCO_3$ and $CeCO_3$ precipitates.

The second vessel was charged with a mixture of aqueous solutions of $TiCl_4$, $SnCl_4$, $ZrOCl_2.8H_2O$, $MnCl_2.4H_2O$ and $ZnCl_2$. After adding 15 ml of a stabilizer (30% aqueous $H_2O_2$), sodium hydroxide (NaOH) was added to adjust the pH of the mixture to between 9 and 9.5 for producing a precipitate containing Ti, Sn, Zr, Mn and Zn.

The slurries containing the precipitates formed in the two vessels were combined and the mixture was subjected to filtration and washing with water. The filter cake was crushed in a ball mill, passed through a filter and dried to provide a fine-grained (0.02 μm) raw ceramic material.

This material was calcined at 900° C. for 1 hour to provide a $(BaSrMg)(TiSnZr)O_3$ powder. The powder was treated as in Example 1 to produce a capacitor except that the firing temperature was 1,150° C. The capacitor had the following electrical properties.

| ε | tan δ (%) | TC | Breakdown Voltage (kv/mm) |
| --- | --- | --- | --- |
| 6,000 | 1.5 | +15% ~ −48% | 38 |

EXAMPLE 3

The following starting materials were used.

| Compounds | Weight (g) |
| --- | --- |
| $Ba(NO_3)_2$ | 100 |
| $Ca(NO_3)_2.4H_2O$ | 7.848 |
| $TiCl_4$ | 73.206 |
| $ZrOCl_2.8H_2O$ | 10.68 |
| $SnCl_4$ | 0.8436 |
| $Bi(NO_3)_3.5H_2O$ | 1.0488 |
| $Pb(NO_3)_2$ | 1.0827 |
| $Sm(NO_3)_3.6H_2O$ | 0.255 |

The first vessel was charged with a mixture of aqueous solutions of $Ba(NO_3)_2$ and $Ca(NO_3)_2.4H_2O$. To the mixture, sodium carbonate ($Na_2CO_3$) was added under the bubbling of carbon dioxide ($CO_2$) to adjust the pH of the mixture to between 7 and 10 for providing $BaCO_3$ and $CaCO_3$ precipitates.

The second vessel was charged with a mixture of aqueous solutions of $TiCl_4$, $ZrOCl_2.8H_2O$, $SnCl_4$, $Bi(NO_3)_3.5H_2O$, $Pb(NO_3)_2$ and $Sm(NO_3)_3.6H_2O$. After adding 15 ml of a stabilizer (30% aqueous $H_2O_2$), sodium hydroxide (NaOH) was added to adjust the pH of the mixture to between 7 and 10 for producing a precipitate containing Ti, Zr, Sn, Bi, Pb and Sm.

The slurries containing the precipitates formed in the two vessels were combined and the mixture was subjected to filtration and washing with water. The filter cake was crushed in a ball mill, passed through a filter and dried to provide a fine-grained (0.015 μm) raw ceramic material.

This material was calcined at 800° C. for 1 hour to provide a $(Ba, Ca, Pb)(Ti, Zr, Sn, Bi)O_3$ powder. The powder was treated as in Example 1 to produce a capacitor except that the firing temperature was 1,120° C. The capacitor had the following electrical properties.

| ε | tan δ (%) | TC | Breakdown Voltage (kv/mm) |
|---|---|---|---|
| 7,900 | 1.5 | +10% ~ −49% | 40 |

A laminated capacitor was also fabricated from the calcined fine-grained raw ceramic material by the following procedure. First, a binder and a dispersant were kneaded into the powder to form a paste. A dielectric ceramic layer 20 μm thick was formed from this paste by the printing technique. To this layer, a coating of Ag-Pd (weight ratio, 70:30) paste was printed as an internal electrode. This was repeated to form 10 laminations of the dielectric ceramic layer. The resulting laminated structure was fired at 1,120° C. for 20 hours, and an electrode for external connection was formed on both sides of the structure. A laminated capacitor measuring 4 mm×3 mm×0.15 mm resulted, and it had a static capacitance of 0.43 μF. Each of the dielectric ceramic layers fired had a thickness of 12 μm.

EXAMPLE 4

The following starting materials were used.

| Compounds | Weight (g) |
|---|---|
| $BaCl_2.2H_2O$ | 15.195 |
| $NdCl_3.6H_2O$ | 103.38 |
| $TiCl_4$ | 61.227 |
| $Bi(NO_3)_3.5H_2O$ | 19.425 |
| $MnCl_4.4H_2O$ | 0.29 |
| $SiCl_4$ | 0.27 |

In the first vessel, ammonium carbonate [$(NH_4)_2CO_3$] was added to an aqueous solution of $BaCl_2.2H_2O$ so as to adjust the pH of the mixture to between 9 and 9.5 for providing a $BaCO_3$ precipitate.

The second vessel was charged with a mixture of aqueous solutions of $NdCl_3.6H_2O$, $TiCl_4$, $Bi(NO_3)_3.5H_2O$, $MnCl_4.5H_2O$, $MnCl_4.4H_2O$ and $SiCl_4$. After adding 10 ml of a stabilizer (30% aqueous $H_2O_2$), ammonium hydroxide ($NH_4OH$) was added to adjust the pH of the mixture to between 9 and 9.5 for producing a precipitate containing Nd, Ti, Bi, Mn and Si.

The slurries containing the precipitates formed in the two vessels were combined and the mixture was subjected to filtration and washing with water. The filter cake was crushed in a ball mill, passed through a filter and dried to provide a fine-grained (0.01 μm) raw ceramic material.

This material was calcined at 800° C. for 1 hour to provide a Ba(Nd, Ti, Bi)$O_7$ powder. The powder was treated as in Example 1 except that the firing temperature was 1,100° C. The resulting capacitor was checked for its electrical properties as in Example 1, except that the temperature characteristics (TC) of the dielectric constant were determined for the temperature range of −55° to +125° C., on the basis of the value at +25° C.

| ε | tan δ (%) | TC | Breakdown Voltage (kv/mm) |
|---|---|---|---|
| 90 | 0.01 | ±0% | 75 |

EXAMPLE 5

The following starting materials were used.

| Compounds | Weight (g) |
|---|---|
| $CaCl_2$ | 58.482 |
| $TiCl_4$ | 100 |
| $Nb_2Cl_5$ | 17.805 |

In the first vessel, sodium carbonate ($Na_2CO_3$) was added to an aqueous solution of $CaCl_2$ so as to adjust the pH of the mixture to between 9 and 9.5 for providing a $CaCO_3$ precipitate.

The second vessel was charged with a mixture of aqueous solutions of $TiCl_4$ and $Nb_2Cl_5$. After adding 25 ml of a stabilizer (30% aqueous $H_2O_2$), sodium hydroxide (NaOH) was added to adjust the pH of the mixture to between 9 and 9.5 for providing a precipitate containing Ti and Nb.

The slurries containing the precipitates formed in the two vessels were combined and the mixture was subjected to filtration and washing with water. The filter cake was crushed in a ball mill, passed through a filter and dried to provide a fine-grained (0.01 μm) raw ceramic material.

This material was calcined at 800° C. for 1 hour to provide a Ca(Ti, Nb)$O_3$ powder. The powder was treated as in Example 1 except that the firing temperature was 1,100° C., and the resulting capacitor was checked for its electrical properties as in Example 1, except that the temperature characteristics (TC) of the dielectric constant were determined for the range of −55° to +125° C. on the basis of the value at +25° C.

| ε | tan δ (%) | (ppm/°C.) | Breakdown Voltage (kv/mm) |
|---|---|---|---|
| 150 | 0.02 | 780 | 68 |

EXAMPLE 6

The following starting materials were used.

| Compounds | Weight (g) |
|---|---|
| $BaCl_2.2H_2O$ | 53.17 |
| $TiCl_4$ | 41.29 |
| $CeCl_3$ | 2.32 |
| $ZrOCl_2.8H_2O$ | 3.04 |
| $MnCl_2.4H_2O$ | 0.18 |

In the first vessel, ammonium carbonate [$(NH_4)_2CO_3$] was added to an aqueous solution of $BaCl_2.2H_2O$ so as to adjust the pH of the mixture to between 9 and 9.5 for producing a $BaCO_3$ precipitate.

The second vessel was charged with a mixture of aqueous solutions of $TiCl_4$, $CeCl_3$, $ZrOCl_2.8H_2O$ and $MnCl_2.4H_2O$. After adding 10 ml of a stabilizer (30% aqueous $H_2O_2$), ammonium hydroxide ($NH_4OH$) was added to adjust the pH of the mixture to between 9 and 9.5 for producing a precipitate containing Ti, Ce, Zr and Mn. In Example 6, Ce was added as both a crystal growth regulator and depressor.

The slurries containing the precipitates formed in the two vessels were combined, and the mixture was subjected to filtration and washing with water. The filter cake was crushed in a ball mill to provide fine grains of sizes between 0.01 and 0.02 μm. They were subsequently filtered, dired and calcined at 1,000° C. for 1 hour.

A binder (polyvinyl acetate) and a solvent (toluene) were kneaded into the calcined powder to form a slurry. A green ceramic sheet was made of this slurry by doctor blading, and a coating of palladium paste was printed on the green sheet to form an internal electrode. Thirty green sheets with the palladium coat were stacked one on top of another and thermally bonded to form an integral structure. It was fired in air at 1,300° C. for 2 hours to fabricate a laminated ceramic capacitor element.

Figure 2:
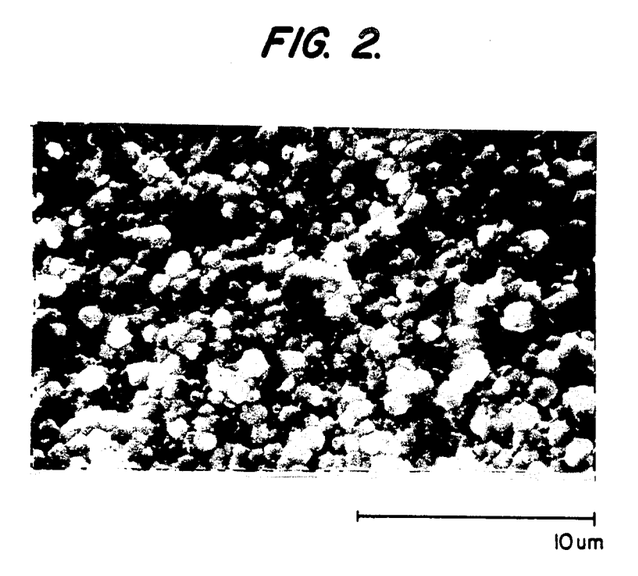
FIG. 2 is a micrograph of the surface of an article prepared according to the present invention.

Observation of the surface of the ceramic article with a microscope showed that the crystal grains in the ceramic were in the range of 0.8 and 1.0 μm. A micrograph of the surface of the ceramic article is shown in FIG. 2.

Figure 3:
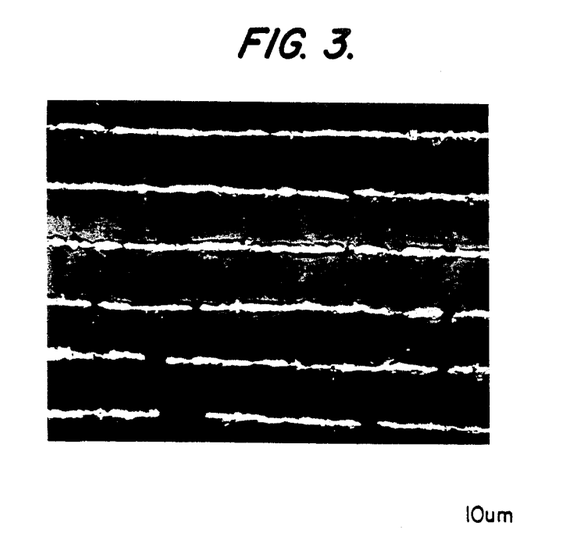
FIG. 3 is a micrograph of the polished surface of a laminated ceramic capacitor element fabricated according to the present invention.

A cross section was cut from the capacitor element and polished. A micrograph of the polished surface is shown in FIG. 3, from which one can see that the capacitor element prepared from the raw ceramic powder obtained in Example 6 had fewer pores.

Figure 4:
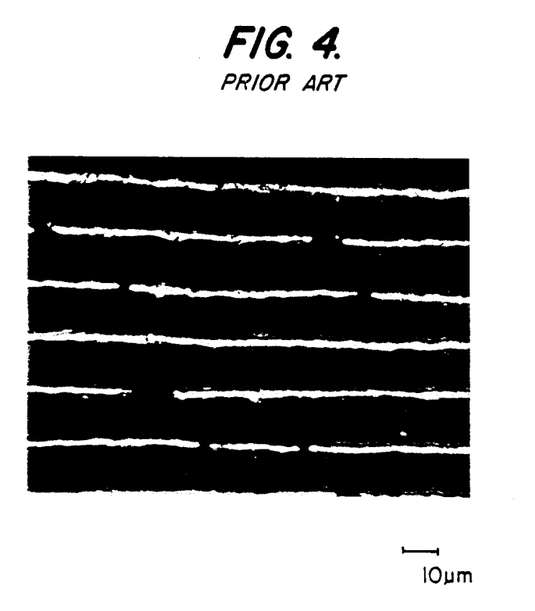
FIG. 4 is a micrograph of the polished surface of a laminated ceramic capacitor element fabricated from a powder prepared by the conventional solid-phase sintering technique.

A comparative laminated ceramic capacitor element was prepared from a calcined powder obtained by the conventional solid phase sintering technique. A cross section was cut from this element and polished. A micrograph of the polished surface is shown in FIG. 4, from which one can see the presence of more pores than in the cross section shown in FIG. 3.

An electrode for external connection was formed on both sides of the laminated capacitor element of the present invention to fabricate laminated ceramic capacitors.

The dielectric constant ($\epsilon$) of the capacitors was in the range of 10,000 to 11,000. The temperature characteristics of the dielectric dissipation factor (tan $\delta$) and the percent change of dielectric constant are shown in FIGS. 5 (a) and (b), respectively.

Figure 6:
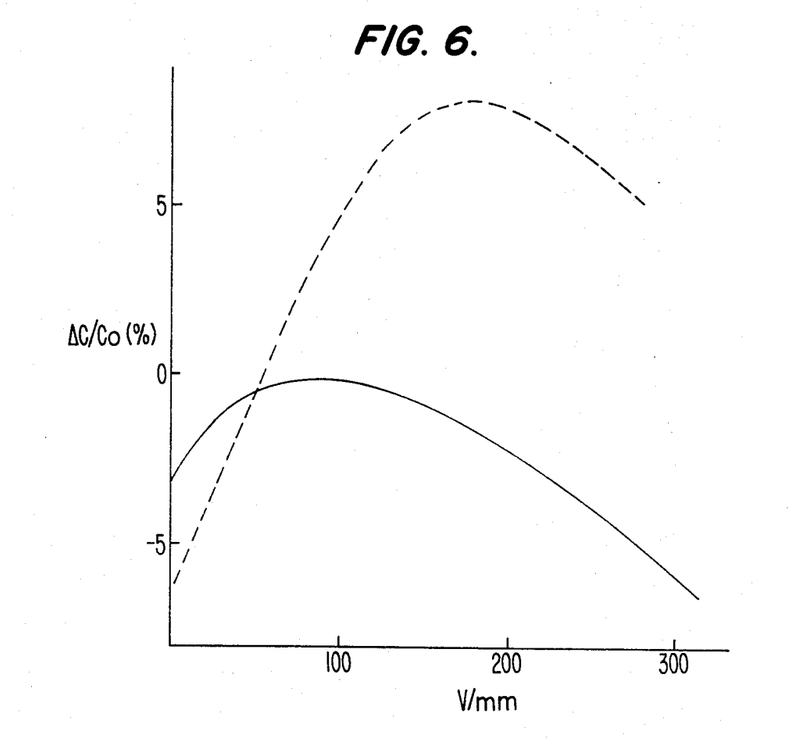
FIG. 6 shows the percent change in capacitance upon application of AC bias voltage.
Figure 7:
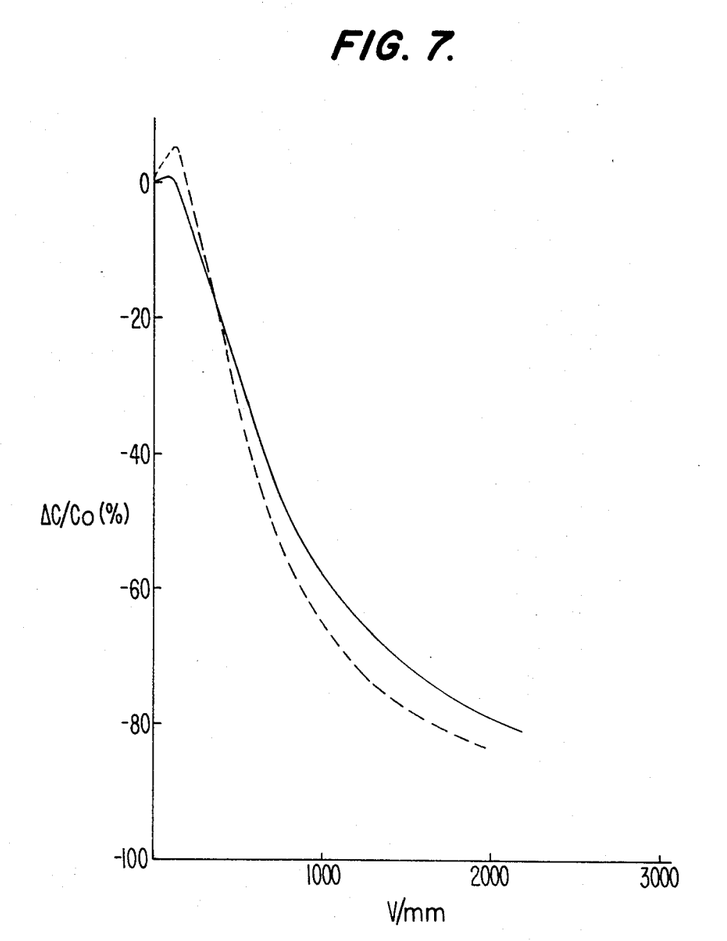
FIG. 7 shows the percent change in capacitance upon application of DC bias voltage.

The percent changes in capacitance of the samples upon application of AC and DC bias voltages are shown in the graphs of FIGS. 6 and 7, respectively.

Figure 8:
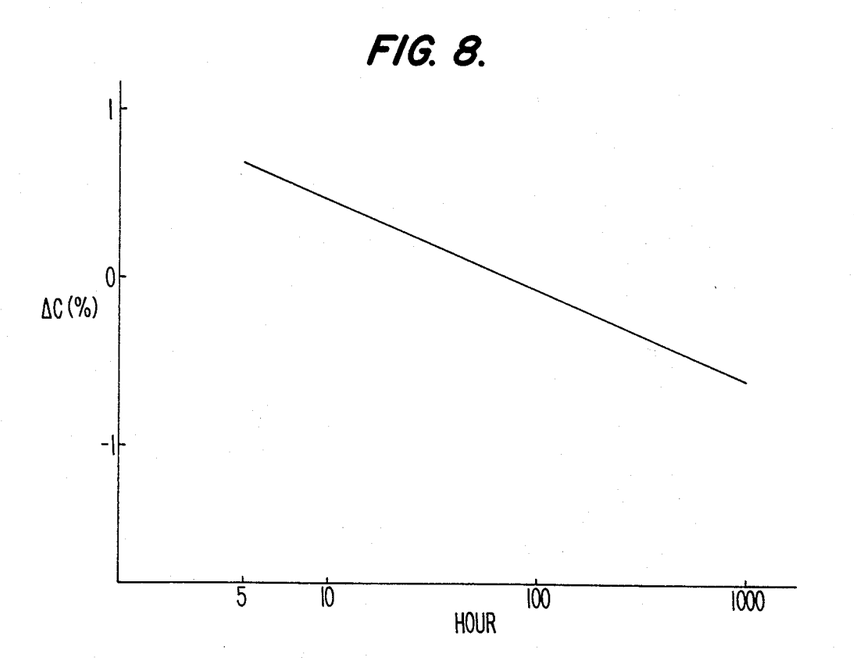
FIG. 8 shows the aging characteristics of capacitance.

The aging characteristics of capacitance are depicted in the graph of FIG. 8.

Figure 5A:
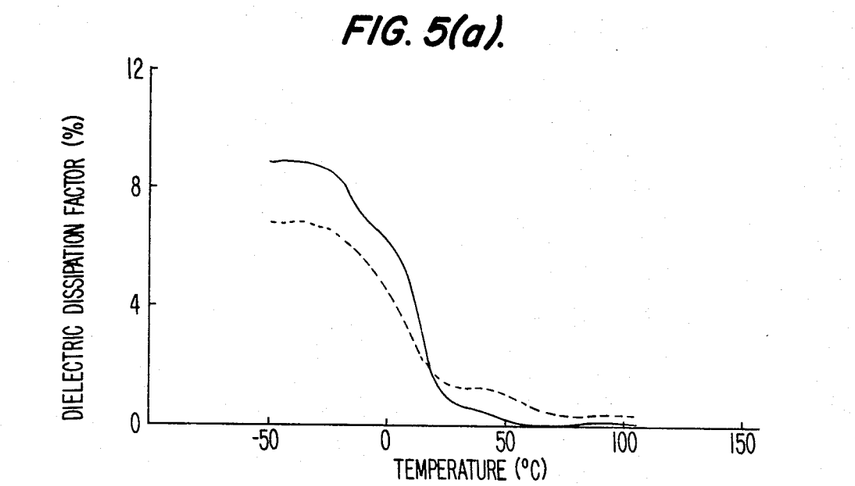
Figure 5B:
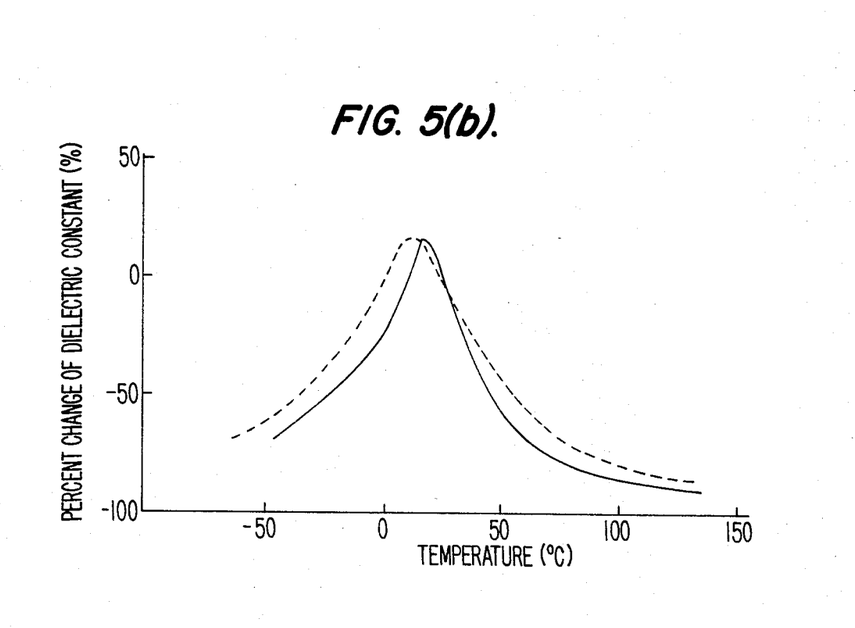

The temperature characteristics of the dielectric dissipation factor (tan $\delta$) and percent change of dielectric constant, as well as the change in capacitance due to applications of AC and DC bias voltages were also measured for the comparative samples and are shown by dashed lines in FIGS. 5 (a), (b), FIGS. 6 and 7, respectively.

The dielectric dissipation factor (tan $\delta$) of the comparative samples was 3.58%, and their aging characteristics of capacitance were in the range of 7 to 8%.

While the invention has been described in detail and with reference to specific embodiments thereof, it will be apparent to one skilled in the art that various changes and modifications can be made therein without departing from the spirit and scope thereof.

What is claimed is:

1. A process for preparing a particulate ceramic material comprising the steps of:
   (a) adding carbon dioxide or an aqueous solution of a soluble carbonate to first aqueous solution of a nitrate or chloride of Ba, Sr, Ca or Mg in a first vessel to adjust the pH of said first aqueous solution to between 7 and 10 thereby forming a carbonate precipitate;
   (b) adding an aqueous solution of a soluble hydroxide to a second aqueous solution of a nitrate or chloride of Ti, Zr, Sn or Pb in a second vessel to adjust the pH of said second aqueous solution to between 7 and 10 thereby forming a hydroxide precipitate;
   (c) combining slurries containing the precipitates formed in said first and second vessels;
   (d) mixing the combined slurries;
   (e) passing the slurries through a filter;
   (f) washing the filter cake with water;
   (g) drying the filter cake to form a powder;
   (h) calcining the dried powder; and
   (i) grinding the calcined powder.

2. The process according to claim 1, wherein the aqueous solution of nitrate or chloride used in said second vessel further contains at least one element selected from the group consisting of Nb, Y and rare earth metal.

3. The process according to claim 1, wherein the aqueous solution of nitrate or chloride used in said second vessel further contains at least one element selected from the group consisting of Mn, Al, Si, Bi and Zn.

4. The process according to claim 1, wherein the powder is calcined at a temperature in the range of from 700° to 1,200° C.

* * * * *